Patented Oct. 6, 1953

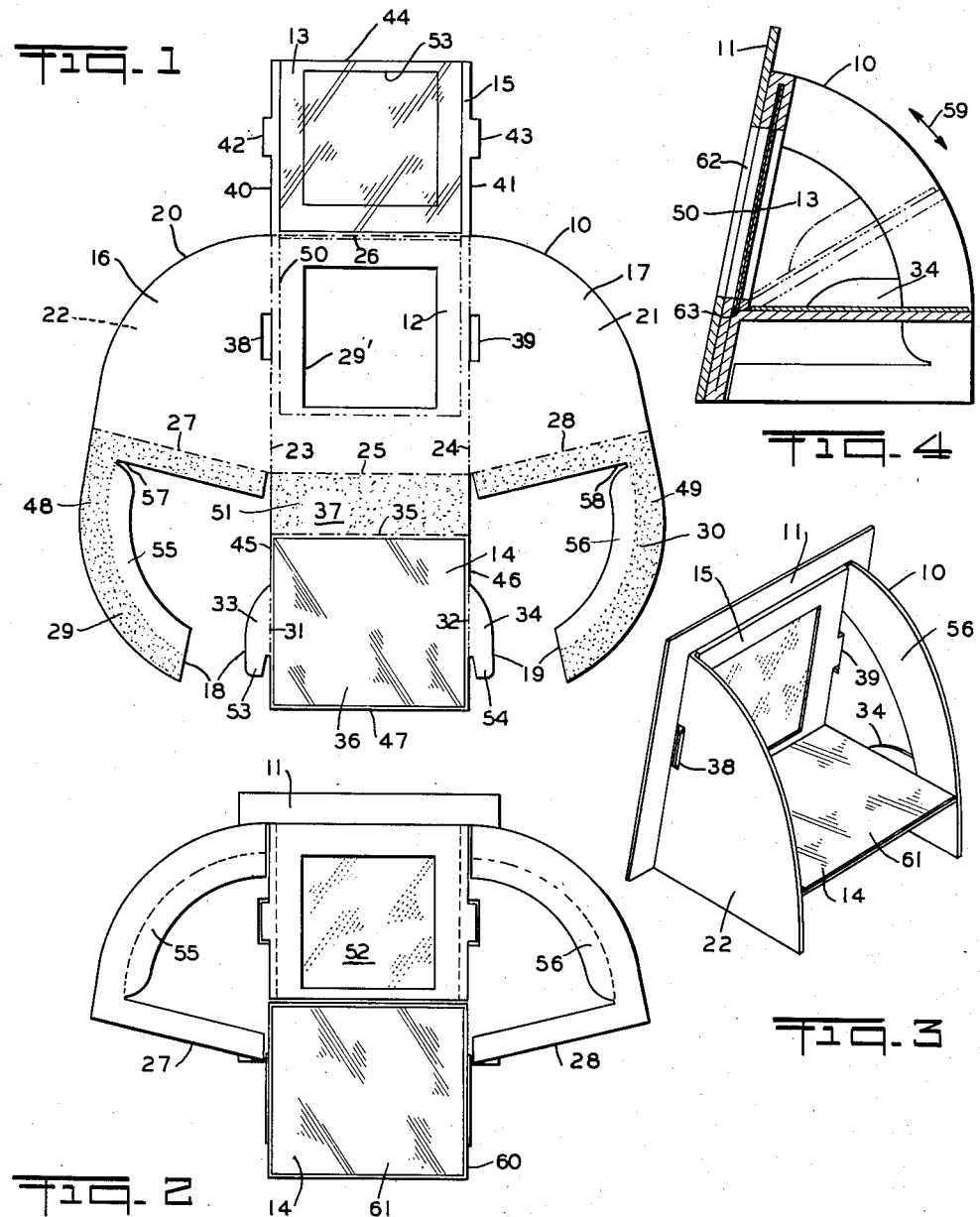

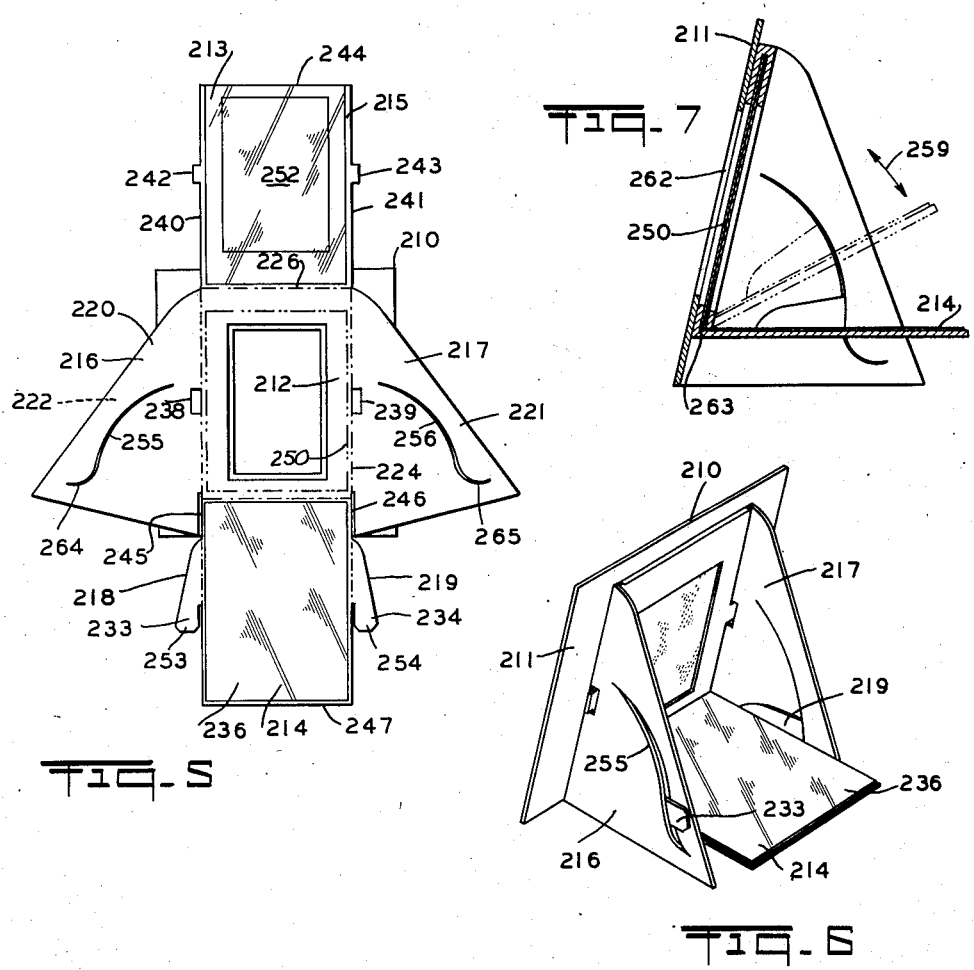

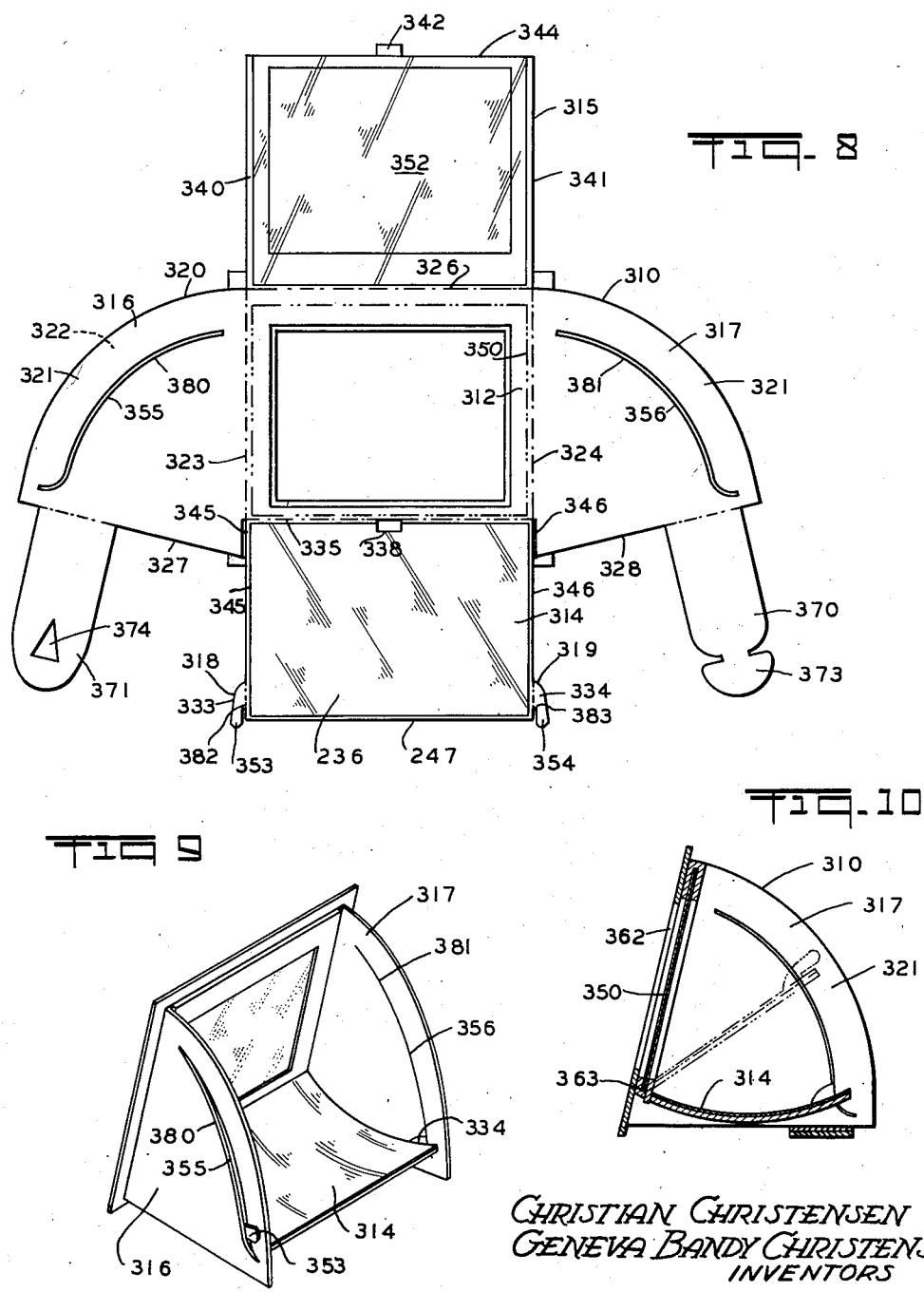

2,654,173

UNITED STATES PATENT OFFICE 2,654,173

TRANSPARENCY VIEWING DEVICE

Christian Christensen and Geneva Bandy Christensen, New Rochelle, N. Y.

Application October 31, 1946, Serial No. 706,840

5 Claims. (Cl. 40—152.2)

1

This invention relates generally to devices for the viewing of transparencies and more particularly to such using an external source of illumination.

A very wide use of transparencies, particularly in color, which create the most accurate color rendition when viewed by transmitted light, has given rise to the need for devices which may illuminate the same with sufficient brilliancy.

While it has been proposed to manufacture and use devices containing their own source of illumination such as incandescent bulbs or the like, such constructions are subject to the disadvantage that when they are powered from external source of electrical energy they are relatively expensive and require external wiring. Furthermore, unless they are of ungainly size, adequate illumination is frequently accompanied by excess heat which is deleterious to the dyes forming the image. Forms utilizing a self-contained source of power such as dry cells are open to the objection that during this use the dry cells deteriorate and when in prolonged use, the dry cells become exhausted.

It is therefore among the principal objects of the present invention to provide transparency viewing devices which utilize an external source of illumination and which are of simple and economical construction so that they may be manufactured in large scale at relatively low cost and have a consequent wide sale and use. By virtue of the low cost of our devices, a large number of them may be used so that it becomes less necessary to shift a number of transparencies with respect to a given viewing device.

Another object herein lies in the provision of structure of the class described which is collapsible so that the same may occupy small space when stored or not in use. In being capable of being flattened to a planar condition, our devices may be sent through the mail together with accompanying transparencies to comprise a package of small bulk.

Another object herein lies in the provision of construction of the class described which is readily set up or dismantled, no special skill or tools being required.

Another object herein lies in the provision of transparency viewing devices for use with an external source of illumination wherein a reflector is movable with respect to the entire device so that the device may be used in a number of positions and yet be able to pick up the light for reflection through the transparency, said light having emanated from a relatively remote point.

Another object herein lies in the provision of a transparency device having a movable mirror, and means for retaining the mirror in adjusted positions thereof.

A feature of the invention lies in the provision of combined transparency supporting and light diffusing means which is locked in operative position by other parts of the device.

2

Another object herein lies in the provision of a device of the class described wherein a flexible reflector is provided whereby the same may be bent to produce a relatively convex or concave reflector.

These objects and other incidental ends and advantages will more fully appear in the progress of this disclosure and be pointed out in the appended claims.

In the drawings in which similar reference characters designate corresponding parts throughout the several views:

Figure 1 is a developed view in plan of a first embodiment of the invention.

Figure 2 is a view similar to Figure 1 but showing certain of the parts in a partially set up condition with a transparency in place.

Figure 3 is a rear perspective view of the device of Figures 1 and 2, in a fully set up condition.

Figure 4 is a central vertical sectional view of the device shown in Figure 3 with the parts exaggerated in thickness for the purpose of clarity.

Figure 5 is a developed plan view of a second embodiment of the invention.

Figure 6 is a rear perspective view of the device of Figure 5 in a set up condition.

Figure 7 is a central vertical sectional view of Figure 6 with the thickness of the parts exaggerated for clarity.

Figure 8 is a developed plan view of a third embodiment of the invention.

Figure 9 is a rear perspective view of the device shown in Figure 8, as fully set up.

Figure 10 is a central vertical sectional view of the device of Figure 9. The thickness of the parts is exaggerated for the purpose of clarity.

In the first embodiment of the invention the transparency device generally indicated by reference character 10 includes broadly a decorative frame 11, a body 12, a diffuser 13, a reflector 14, a transparency support 15, support elements 16 and 17 and interengaging means 18 and 19. The body 12, the reflector 14, the transparency support 15, the support elements 16 and 17 and the interengaging means 18 and 19 are all preferably cut from a single sheet of planar material which is preferably resilient and relatively stiff, although bendable when its elastic limit is exceeded. Examples of such materials are heavy paper, cardboard, stiffened cloth, fiber, thin sheets of synthetic resin, or thin sheets of metal. We have found cardboard to be satisfactory because in addition to the above described characteristics it may be also relatively opaque, reflective where desired, and may have a low fabrication cost. Thus, the blank 20 may have its upper or rear surface 21, white in color, while its lower or forward surface 22 may be of a dark color or a color adapted to harmonize with the exterior surfaces of the decorative frame 11. The blank 20 is preferably scored along fold lines to facilitate the erection of the device. Thus, the fold lines 23 and 24 lie between the body 12 and the support elements 16 and 17; the fold line 25 lies between the body 12 and the reflector element 14; the fold line 26 lies between the body 12 and the transparency support element 15; and the fold lines 27 and 28 lie between the support elements 16 and 17, and the frictional guides 29 and 30 respectively; and the fold lines 31 and 32 lie between the reflector 14 and the hook tabs 33 and 34. The reflector 14 has another fold line 35 which enables the portion of the reflector element having the reflecting surface 36 to lie in planes independent of the securing portion 37. The blank 20 is of irregular shape best seen in Figure 1.

The blank 20 along the lines 23 and 24 is provided with a pair of slots 38 and 39. As shown, the slots are preferably located at the lines 23 and 24 and extend laterally into the support elements 16 and 17. The body 12 is provided with a body orifice 29' of a size and shape corresponding to the size and shape of the transparency generally indicated by reference character 50 which may be of any suitable type, as for example, those sold under the trade-mark "Kodachrome."

The transparency support 15 includes side edges 40 and 41 having projections 42 and 43, and a large transverse free edge 44.

The reflector element 14 includes side edges 45 and 46 and a relatively free transverse edge 47.

The surface 21 of the blank 20 in the areas indicated by reference characters 48 and 49 are preferably gummed or provided with a suitable adhesive. Similarly, the area 37, that is to say, the surface 21 of the securing portion is similarly provided with an adhesive indicated by reference character 51.

The diffuser element 13 may be composed of any suitable material such as, for example, sheet transparent cellulose acetate or cellulose nitrate, or a similar transparent synthetic resin which is substantially colorless, having one surface 52 thereof roughened to simulate ground glass. The diffuser 13 is preferably adhesive, secured to the border of the orifice 53 in the transparency support 15.

The device may be shipped and stored in a planar condition as shown in Figure 1.

When it is desired to set the device 10 up, the gummed areas 29 and 30 are adhesively secured to the surface 21 of the support elements 16 and 17, and the gummed area 51 is secured to the surface 21 of the body 12. Following this, the transparency 50 is placed upon the surface 21 within the area indicated by the dash double dot lines 50. Next, the transparency support 15 is folded inwardly about the line 26 until the diffuser contacts the then upper surface of the transparency. Next, the support elements 16 and 17 are folded inwardly about the lines 23 and 24 so that the projections 42 and 43 become engaged within the slots 38 and 39.

The tabs 33 and 34 are bent inwardly through ninety degrees and the terminals 53 and 54 are inserted under the portions 55 and 56 of the frictional guides 29 and 30.

The insertion of the terminals 53 and 54 is facilitated by passing them through the notches 57 and 58.

The decorative frame 11 may have been previously installed by adhesively securing the same to the surface 22 of the blank 20 at a previous stage or the same may be put in place at this time. For commercial purposes, it is preferable that the frame 11 be installed after the blank 20 has been cut out and gummed.

The device now fully set up may appear as shown in Figure 3. The reflector element 14 is pivotally movable about the fold line 35 as an axis in the directions of the arrow 59 on Figure 4. In that view the reflector element is shown in an altered position thereof in dash triple dot lines. Utilizing the well-known law of reflection, that the angle of reflection is equal to the angle of incidence, the reflector is moved to a position so that rays of light cast upon it by any suitable source, such as a window or a source of artificial illumination (not shown) are reflected upon the rear surface of the diffuser 13, whence they pass outwardly and forwardly through the transparency 50 to be viewed by the user whose eyes are placed forwardly of the device and preferably in line with the rays of light passing forwardly through the device. When the mirror is adjusted, it is retained in an adjusted position by the frictional engagement of the terminals 53 and 54 between the portions 55 and 56 and the inner surfaces 21 of the support elements 16 and 17.

The reflector element 14 may be constructed as shown in which the cardboard or similar base 60 may have a thin layer of metal foil suitably secured thereto as by an adhesive. This foil 61 has a reflecting surface 36. The metallic foil is desirable because of its low cost and the fact that it is not easily broken. Other reflecting surface materials such as a glass mirror or a plastic mirror composed of a metallic coating upon a synthetic resin of sheet may be used.

The frame 11 has an orifice 62 and since its principal purpose is to form a decorative border for the picture or transparency 50 and to generally conceal the structure to the rear thereof, may be of suitable size, shape and decoration.

The transparency 50 is clamped by the structure previously described between the body 12 and the support 15 so that even where its lower edge 63 does not rest upon the fold 35, it is frictionally retained in place.

Turning now to the second embodiment of the invention illustrated in Figures 5 to 7 inclusive, for the purpose of avoiding needless repetition, certain of the parts corresponding to the first embodiment are given the same reference characters with the addition of the prefix 2.

The second embodiment differs from the first embodiment principally in the elimination of the portions 55 and 56 and associated structure so that the use of all of the material below the lines 27 and 28 is avoided with a corresponding saving in cost and manufacturing expense. In the second embodiment of the invention the tabs 233 and 234 engage within slots 255 and 256 in the support elements 216 and 217. These slots 255 and 256 are of irregular shape best seen in Figure 5 and have the outer end portions 264 and 265 thereof arcuately and outwardly diverging to facilitate the entrance therein of the terminals 253 and 254 in setting up the device.

Turning now to the third embodiment of the invention, here again for the purpose of avoiding needless repetition, certain of the parts corresponding to the prior embodiments are given the same reference characters but with the prefix 3.

The third embodiment is similar to the second embodiment in that the slots 355 and 356 are utilized in an engagement by the tabs 333 and 334 when such engagement is desired.

The transparency support 315 is provided with only a single projection 342 which engages the slot 338 at the juncture of the reflector element 314 with the body 312.

The lower edges 327 and 328 of the support elements 316 and 317 are provided with means for detachably interengaging the support elements 316 and 317 so that they are maintained in spaced arrangement. Said last mentioned means includes a headed or hook type tab 370 which is detachably engageable with the female tab 371. The purpose of the tabs 370 and 371 is to secure the edges 327 and 328 in predetermined spaced relation when the device 310 is set up. The total effective length of the tabs 370 and 371 when they have been interengaged by passing the head 373 through the slot 374 is preferably slightly less than the distance between the edges 345 and 346 of the reflector 314 so that when the device is set up as shown by the dash triple dot lines in Figure 10 wherein the tabs 333 and 334 are not engaged within the slots 355 and 356, the edges 345 and 346 are frictionally engaged by the inner surfaces 321 of the support elements 316 and 317. The partial cylindrical curvature of the reflector 314 may be adjusted by changing the depth of the slots 382 and 383.

The reflector 314 is of a flexible nature and may consist of a flexible piece of cardboard with a metallic foil coating or may be a flexible sheet of transparent synthetic resin having a reflective surface, as for example, being "silvered" in a well known mirror fabrication fashion. The reflector 314 is preferably flexible but stiff and resilient. Thus, when it is merely frictionally engaged between the inner opposed walls of the support elements 316 and 317 it acts as a plane mirror. The distance between the upper portions 380 and 381 and the line 335 is slightly less than the distance between the innermost portions of the notches 382 and 383 and said line 335. Thus, when the terminals 353 and 354 have been passed outwardly through the slots 355 and 356, the reflector 314 is caused to bow in a convex or concave manner. It may thus take the position shown, for example, in Figure 10. The reflector 314 may then be adjusted to have a light condensing effect in casting rays upon the diffuser and/or transparency 350. When a convex effect is desired the reflector may be bowed in an opposite direction.

We wish it to be understood that we do not desire to be limited to the exact details of construction shown and described for obvious modifications will occur to a person skilled in the art.

We claim:

1. A transparency viewing device for use with a non-self-contained source of illumination, said device comprising: a body having a first orifice; a transparency support having a second orifice; a pair of support elements movably connected to said body; said transparency support being foldable upon said body; and means to detachably interengage said transparency support with said support elements including at least one fixed projection upon said transparency support, and at least one slot disposed in one of said support elements at the line of connection between said support element and said body; movement of said support element serving to engage said projection in said slot, after said transparency support has been folded upon said body.

2. A transparency viewing device for use with a non-self-contained source of illumination, said device comprising: a body having a first orifice; a movable reflector connected to said body; a transparency support having a second orifice; a pair of support elements movably connected to said body; said transparency support being foldable upon said body; and means to detachably interengage said transparency support with said reflector including a fixed projection upon said transparency support and a slot disposed in said reflector at the line of connection between said movable reflector and said body; movement of said reflector serving to engage said projection in said slot after said transparency support has been folded upon said body.

3. A transparency viewing device for use with a non-self-contained source of illumination, said device comprising: a body having a first orifice; a transparency support having a free edge and a second orifice therein; a pair of support elements movably connected to said body; said transparency support being foldable upon said body; means to maintain said transparency support in a folded condition on said body, said means including a fixed projection upon the free edge of said transparency support and a slot at a corresponding marginal edge of said body; said slot being disposed in structure adjacent the marginal edge of said body, movement of said adjacent structure serving to engage said projection, after said transparency support has been folded upon said body.

4. A transparency viewing device including: a body having means for supporting a transparency thereon and having an orifice therein; support elements connected to said body and having curved slots therein; a reflector pivotally connected to said body, said reflector having means for maintaining the same in adjusted positions thereof, said means including foldable tabs the terminals of which may penetrate said slots; said tabs lying in the planes of said support elements, whereby complete adjustment may be obtained by sliding said terminals throughout the length of said slots.

5. A transparency viewing device comprising: a body having an orifice therein; a pair of supporting elements foldably connected to said body; means to hold a transparency in juxtaposition with said body; a flexible reflector pivotally connected to said body; and means to curve said reflector to form a curvilinear surface, the center of curvature of which is located in a direction toward said transparency holding means; said curving means including at least one foldable tab having a terminal, mounted on the marginal edge of said flexible reflector, said terminal being engageable with an elongated slot in one of said support elements.

CHRISTIAN CHRISTENSEN.
GENEVA BANDY CHRISTENSEN.

References Cited in the file of this patent

UNITED STATES PATENTS

| Number | Name | Date |
|---|---|---|
| 956,916 | Wiederseim | May 3, 1910 |
| 1,097,009 | Dill | May 19, 1914 |
| 1,174,914 | Vetter | Mar. 7, 1916 |
| 1,315,516 | Korfist | Sept. 9, 1919 |
| 1,754,871 | Wise | Apr. 15, 1930 |
| 1,769,377 | Lindsey | July 1, 1930 |
| 2,027,790 | Schneider | Jan. 14, 1936 |

FOREIGN PATENTS

| Number | Country | Date |
|---|---|---|
| 304,911 | Great Britain | Jan. 31, 1929 |
| 377,402 | Italy | Dec. 16, 1939 |
| 774,753 | France | Sept. 24, 1934 |